(12) United States Patent
Savransky et al.

(10) Patent No.: US 9,760,966 B2
(45) Date of Patent: Sep. 12, 2017

(54) PARALLEL PROCESSOR WITH INTEGRATED CORRELATION AND CONVOLUTION ENGINE

(71) Applicant: NVIDIA Corporation, Santa Clara, CA (US)

(72) Inventors: Guillermo Savransky, Mountain View, CA (US); Joseph Stam, Holland, MI (US)

(73) Assignee: Nvidia Corporation, Santa Clara, CA (US)

( * ) Notice: Subject to any disclaimer, the term of this patent is extended or adjusted under 35 U.S.C. 154(b) by 253 days.

(21) Appl. No.: 13/736,863

(22) Filed: Jan. 8, 2013

(65) Prior Publication Data

US 2014/0192066 A1 Jul. 10, 2014

(51) Int. Cl.
*G06T 1/20* (2006.01)
*G06F 17/15* (2006.01)

(52) U.S. Cl.
CPC .............. *G06T 1/20* (2013.01); *G06F 17/153* (2013.01)

(58) Field of Classification Search
CPC ................................ G06F 17/153; G06T 1/20
USPC ......................................................... 345/506
See application file for complete search history.

(56) References Cited

U.S. PATENT DOCUMENTS

| | | | |
|---|---|---|---|
| 6,104,415 A * | 8/2000 | Gossett .......................... | 345/552 |
| 7,519,223 B2 | 4/2009 | Dehlin et al. | |
| 7,675,524 B1 * | 3/2010 | Miller et al. .................. | 345/586 |
| 7,737,994 B1 * | 6/2010 | Wasserman et al. .......... | 345/615 |
| 7,979,683 B1 * | 7/2011 | Danskin et al. ............... | 712/226 |
| 2003/0084082 A1 * | 5/2003 | Debes ................. | G06F 9/30014 708/420 |
| 2003/0113031 A1 * | 6/2003 | Wal ........................... | G06T 1/20 382/260 |
| 2007/0070079 A1 * | 3/2007 | Chung ...................... | G06T 1/20 345/582 |
| 2007/0292047 A1 * | 12/2007 | Jiao et al. ...................... | 382/279 |
| 2009/0033661 A1 * | 2/2009 | Miller ........................... | 345/426 |
| 2009/0113185 A1 * | 4/2009 | Hansen ............... | G06F 9/30018 712/221 |
| 2009/0265528 A1 * | 10/2009 | Du ........................ | G06T 15/005 712/220 |
| 2010/0027896 A1 | 2/2010 | Geva et al. | |
| 2010/0098350 A1 * | 4/2010 | Zimmer .................... | G06T 5/20 382/264 |
| 2010/0142824 A1 * | 6/2010 | Lu ............................ | G06K 9/32 382/195 |
| 2010/0190480 A1 | 7/2010 | Zheng et al. | |

(Continued)

*Primary Examiner* — Gregory J Tryder
*Assistant Examiner* — Jitesh Patel (57) ABSTRACT

A system and method for performing computer algorithms. The system includes a graphics pipeline operable to perform graphics processing and an engine operable to perform at least one of a correlation determination and a convolution determination for the graphics pipeline. The graphics pipeline is further operable to execute general computing tasks. The engine comprises a plurality of functional units operable to be configured to perform at least one of the correlation determination and the convolution determination. In one embodiment, the engine is coupled to the graphics pipeline. The system further includes a configuration module operable to configure the engine to perform at least one of the correlation determination and the convolution determination.

21 Claims, 6 Drawing Sheets

(56) References Cited

U.S. PATENT DOCUMENTS

2011/0025842 A1 2/2011 King et al.
2011/0115804 A1* 5/2011 Lerner et al. ................. 345/534
2012/0124603 A1 5/2012 Amada
2012/0155703 A1 6/2012 Hernandez-Abrego et al.
2014/0337016 A1 11/2014 Herbig et al.

* cited by examiner

Precomputing A Portion Of At Least One Of A Correlation Computation And A Convolution Computation
602

Receiving A Request To Perform At Least One Of The Correlation Computation And The Convolution Computation
604

Determination A Configuration Of A Plurality Of Execution Units
606

Performing At Least One Of The Correlation Computation And The Convolution Computation Based On The Configuration
608

Sending A Result Of At Least One Of The Correlation Computation And The Convolution Computation
610

Postcomputing A Portion Of At Least One Of The Correlation Computation And The Convolution Computation
612

FIG. 6

PARALLEL PROCESSOR WITH INTEGRATED CORRELATION AND CONVOLUTION ENGINE

FIELD OF THE INVENTION

Embodiments of the present invention are generally related to graphics processing units (GPUs).

BACKGROUND OF THE INVENTION

As computer systems have advanced, graphics processing units (GPUs) have become increasingly advanced both in complexity and computing power. GPUs are thus used to handle processing of increasingly large and complex graphics. In particular, GPUs are well suited for parallel processing. GPUs are further being used for general purpose computing tasks and in particular for computer vision tasks. Computer vision involves the processing of images to make determinations about the contents of multiple images.

Template matching is a ubiquitous operation in the field of computer vision. Template matching attempts to compute how much a region of one image matches another region of the same or a different image. The method for matching may be based on subtraction of two tiles, or on more sophisticated correlation methods. Convolution is another ubiquitous operation where a kernel of coefficients is multiplied by a tile of pixels and the results of the multiplication are summed. Convolutions are frequently used to modify the appearance of an image. For example, convolution may be used for sharpening or blurring an image.

Computation of similarity, correlation, or convolution on pixel tiles is very computation intensive. For rapid or real time matching, custom hardware may be required. However, while custom hardware is efficient, custom hardware is generally inflexible. Different applications may require computations of similarity or correlation metrics in different ways. Matching between images, within images, and with fixed patterns demands flexible hardware. Further, many advanced algorithms dynamically determine which regions to match and such flexibility is not easily accommodated by custom hardware. For example, the value of a similarity metric may be one factor in computing the cost of a match between image regions and smoothness between adjacent regions may be weighted along with normalized cross correlation to compute the total cost which is difficult to perform dynamically with fixed hardware.

A software solution can provide the necessarily flexibility and certain instructions can be used to accelerate portions of an algorithm. Unfortunately, software requires substantial overhead because every detail of the algorithm, being described using instructions, has to be for a general purpose machine, and is not optimized for the specific operation. In addition, both the algorithm and the data handling must conform to the available machine resources (execution on units, memory architecture, etc.).

SUMMARY OF THE INVENTION

Accordingly, what is needed is a solution to allow high performance correlation and convolution with flexibility while allowing use of a variety of different applications. Embodiments of the present invention ease the problem of flexibility while maintaining the advantages of custom hardware by incorporating a correlation and convolution engine with a general purpose massively parallel processor. Embodiments of the present invention provide an engine to perform correlation and convolution computations for processing units (e.g., streaming multiprocessors) of a GPU. Embodiments of the present invention further support higher performance and power savings during performance of computer vision computations.

In one embodiment, the present invention is directed to a computer implemented system for performing computer vision processes. The system includes a graphics pipeline operable to perform graphics processing and an engine operable to perform at least one of a correlation determination and a convolution determination for the graphics pipeline. The graphics pipeline is further operable to execute general computing tasks. The graphics pipeline may be operable to pre-compute a portion of at least one of the correlation determination and the convolution determination. The graphics pipeline may further be operable to post-compute a portion of at least one of the correlation determination and the convolution determination. The engine is operable to perform at least one of the correlation determination and the convolution determination in less time than the graphics pipeline. In one exemplary embodiment, the engine comprises a plurality of functional units configurable to perform at least one of the correlation determination and the convolution determination. In one embodiment, the engine is coupled to the graphics pipeline. A computation may be sent to the engine based an application programming interface (API) call.

The system may include a configuration module operable to configure the engine to perform at least one of the correlation determination and the convolution determination. In one embodiment, each of the execution units is operable to perform one of a plurality of functions, where the one of the plurality of functions is selectable by the configuration module. The configuration module may be operable to determine whether to configure the plurality of functional units for at least one of the correlation determination and the convolution determination based on an instruction received from the graphics pipeline.

In one embodiment, the present invention is directed toward a computer implemented method for accelerating computer vision computations. The method includes receiving a request to perform at least one of a correlation computation and a convolution computation. The request may be received from a graphics pipeline of the GPU. The request may be received via an application programming interface (API). The method further includes determining a configuration of a plurality of execution units. In one embodiment, each of the execution units is operable to perform one of a plurality of functions, where the one of the plurality of functions is selectable by a configuration module. The configuration corresponds to at least one of the correlation computation and the convolution computation.

The method further includes performing at least one of the correlation computation and the convolution computation to generate a result and sending the result of at least one of the correlation computation and the convolution computation to a processing unit of a graphics processing unit (GPU). In one embodiment, the performing of at least one of the correlation computation and the convolution computation is performed by an engine coupled to the graphics pipeline. The method may further include precomputing a portion of at least one of the correlation computation and the convolution computation. The method may further include postcomputing a portion of at least one of the correlation computation and the convolution computation.

In another embodiment, the present invention is implemented as a programmable processor. The programmable processor includes a plurality of programmable processing elements operable to perform graphics processing and a plurality of engines each coupled to a respective programmable processing element of the plurality of programmable processing elements. In one embodiment, the plurality of programmable processing elements is operable to perform general computing tasks. In one exemplary embodiment, each of the programmable processing elements is operable to precompute a portion of at least one of the correlation computation and the convolution computation. In another embodiment, each of the programmable processing elements is operable to postcompute a portion of at least one of the correlation computation and the convolution computation.

A computation request may be sent to the engine based an application programming interface (API). Each engine is operable to perform at least one of a correlation computation and a convolution computation. Each engine of the plurality of engines comprises a plurality of execution units and a configuration module operable to configure the plurality of execution units to perform at least one of the correlation computation and the convolution computation. Each of the execution units of the engine is operable to perform one of a plurality of functions where the one of the plurality of functions is configurable by the configuration module.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

Figure 1:
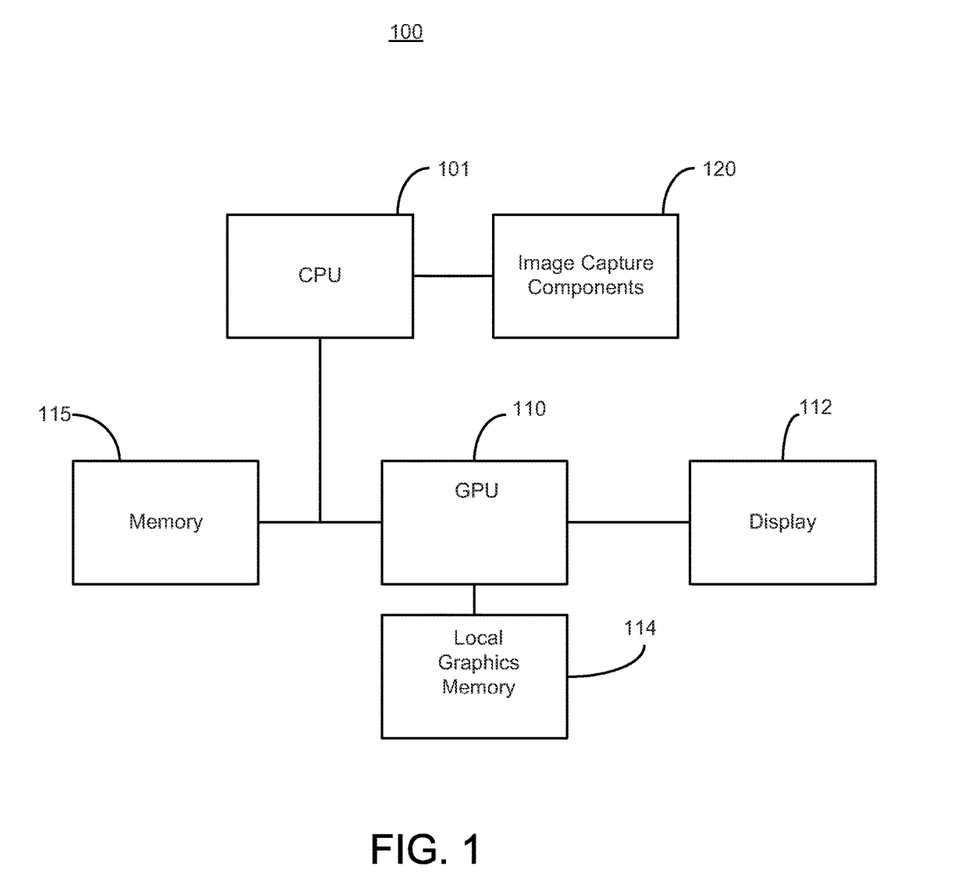
FIG. 1 shows a computer system in accordance with one embodiment of the present invention.

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like. System 100 may further include one or more image capture components 120 (e.g., one or more cameras operable to captures images and video). Image capture components 120 may be coupled to CPU 101, GPU 110, or other components of system 100. Embodiments of the present invention may be operable for processing live video from a single camera or computing depth from a stereo camera pair. In one embodiment comprising a mobile system-on-a-chip, a camera may feed into an image signal processor (ISP) (not shown) contained on the same die as the CPU, GPU, and a correlation and convolution engine. In another embodiment comprising a desktop, notebook computer, or a set-top-box/smart TV/game console, a camera may feed data via a USB bus or some type of proprietary connection.

In one exemplary embodiment, GPU 110 is operable for General-purpose computing on graphics processing units (GPGPU) computing. GPU 110 may execute—CUDA programs and Open Computing Language (OpenCL) programs. CUDA™, available from Nvidia Corporation of Santa Clara, Calif., is a parallel computing platform and programming model that enables dramatic increases in computing performance by harnessing the power of the graphics processing unit (GPU). It is appreciated that the parallel architecture of GPU 110 may have significant performance advantages over CPU 101.

Exemplary Systems and Methods Parallel Processor Comprising a Correlation and Convolution Engine Embodiments of the present invention ease the problem of flexibility while maintaining the advantages of custom hardware by incorporating a correlation and convolution engine with a general purpose massively parallel processor. Embodiments of the present invention provide an engine to perform correlation and convolution computations for processing units (e.g., streaming multiprocessors) of a GPU.

Embodiments of the present invention support higher performance and power savings during performance of computer vision computations.

Open Source Computer Vision Library (OpenCV) is a library of computer vision algorithms useable by an application. Embodiments of the present invention further support Open Source Computer Vision Library (OpenCV) implementations and CUDA. Detailed descriptions of many such algorithms may be found in *Computer Vision: Algorithms and Applications* by Richard Szelisk.

GPUs are particular well suited for computer vision applications because of the highly parallel workload of computer vision applications and the parallel nature of GPUs. Matching is used throughout computer vision. In stereo imaging, a distance between objects viewed by two cameras is determined by computing the relative shift of an object between the right and left camera images. The shift may be determined by computing the similarity between a tile of pixels in one image with a range of tiles along the same row of the opposite or other image to find the best match, which is then proportional to the distance of the object imaged by that pixel. A detailed description of stereo depth computation is provided in *CUDA Stereo Imaging* by Stam, Gallup, and Frahm.

Matching may be used to track frame-to-frame movement of objects by correlating a time sequence of images. A tile of pixels in a first image is compared with several tiles of pixels in the corresponding region of the second image to determine the offset with the best match. Such techniques may be used to compute motion vectors for video compression, perform video stabilization, tracking objects for various computer vision applications, and correct for on offset when accumulating multiple frames for low light imaging or high dynamic range imaging.

Matching may further be used for image noise reduction, such as described in the *Non Local Means* technique of the paper *Image Denoising* by Kharlamov and Podlozhnyuk.

Matching operations may be employed for object detection and recognition. Pre-defined pixel templates containing representations of the objects or portions of the objects to be detected may be compared with different regions of an image to detect those objects in the image. Different scale templates may be used and thus each region of the image may be matched with multiple tiles. Such matching may take place in different domains, e.g., on a Fourier transform of the image.

One method of matching is to compute the sum of absolute differences (SAD) between two image tiles. This may be computed based on the equation:

$$SAD_{x,y} = \sum_i \sum_j |A(x_a + i, y_a + j) - B(x_b + i, y_b + j)|$$

Where A is Image 1, B is image 2, $x_a, y_a$ are the coordinates of the center of the tile location in image 1, $x_b, y_b$ are the coordinates of the center of tile in image 2, i and j range over the size of the template. A and B may refer to the same image in certain cases.

The measure of similarity between image tiles may be determined based on the sum of squared differences (SSD). This may be computed based on the equation:

$$SSD_{x,y} = \sum_i \sum_j (A(x_a + i, y_a + j) - B(x_b + i, y_b + j))^2$$

Where A is Image 1, B is image 2, $x_a, y_a$ are the coordinates of the center of the tile location in image 1, $x_b, y_b$ are the coordinates of the center of tile in image 2, i and j range over the size of the template. A and B may refer to the same image in certain cases.

For both SAD and SSD similarity measurements, lower values may indicate a better match. In a typical application the above formulas are applied at different locations $x_b, y_b$ across the target image to find the best match between a tile in image 1 and a tile in image 2. The lowest value indicates the best match.

Correlation between the two pixel tiles may be determined based on normalized cross correlation (NCC). This may be computed based on the equation:

$$NCC_{x,y} = \frac{\sum_i \sum_j [A(x_a + i, y_a + j) - \overline{A}][B(x_b + i, y_b + j) - \overline{B}]}{\sqrt{\sum_i \sum_j [A(x_a|i, y_a|j)\overline{A}]^2} \sqrt{\sum_i \sum_j [B(x_b|i, y_b|j)\overline{B}]^2}}$$

Where $\overline{A}$ and $\overline{B}$ are the average value of the pixel tiles from image A and B to be correlated.

Embodiments of the present invention are operable to implement a wide variety of the functions described herein. Such functions may be referred to as 'cost functions' where a poor match evaluates to a higher value and thus a higher cost. The goal of many algorithms is to minimize the cost of a match.

It is noted that correlation and convolution are two substantially similar mathematical operations in common in image processing.

Correlation may be defined as:

$$F * I(x, y) = \sum_i \sum_j F(i, j) I(x + i, y + j)$$

Where F is the filter kernel to be correlated with image I at location x,y, i and j range over the size of F.

Convolution may be defined as:

$$F * I(x, y) = \sum_i \sum_j F(i, j) I(x - i, y - j)$$

It is appreciated that convolution is correlation with the kernel flipped diagonally. It is further appreciated that many image modification operators are horizontally and vertically symmetric and thus the terms of correlation and convolution can be used interchangeably. Correlation and convolution can be used to modify the appearance of image, e.g., blurring, sharpening, or emphasizing a particular range of frequencies. Correlation may also be used to measure similarity with a pre-defined template and the SAD, SSD, and NCC methods described herein may be used for that purpose. In signal processing, filtering with convolution may be referred to as a finite impulse response (FIR) filter due to a kernel being of finite size. Wavelet decomposition of an image into multiple frequency components may be performed with convolution filters.

While the above examples and formulas are described with respect to two dimensional images (2D), the techniques are applicable to 1D, 3D or higher dimensionality signals, and for signals other than images.

FIGS. 2-5 illustrate example components used by various embodiments of the present invention. Although specific components are disclosed in systems 200-500, it should be appreciated that such components are examples. That is, embodiments of the present invention are well suited to having various other components or variations of the components recited in systems 200-500. It is appreciated that the components in systems 200-500 may operate with other components than those presented, and that not all of the components of systems 200-500 may be required to achieve the goals of systems 200-500.

Figure 2:
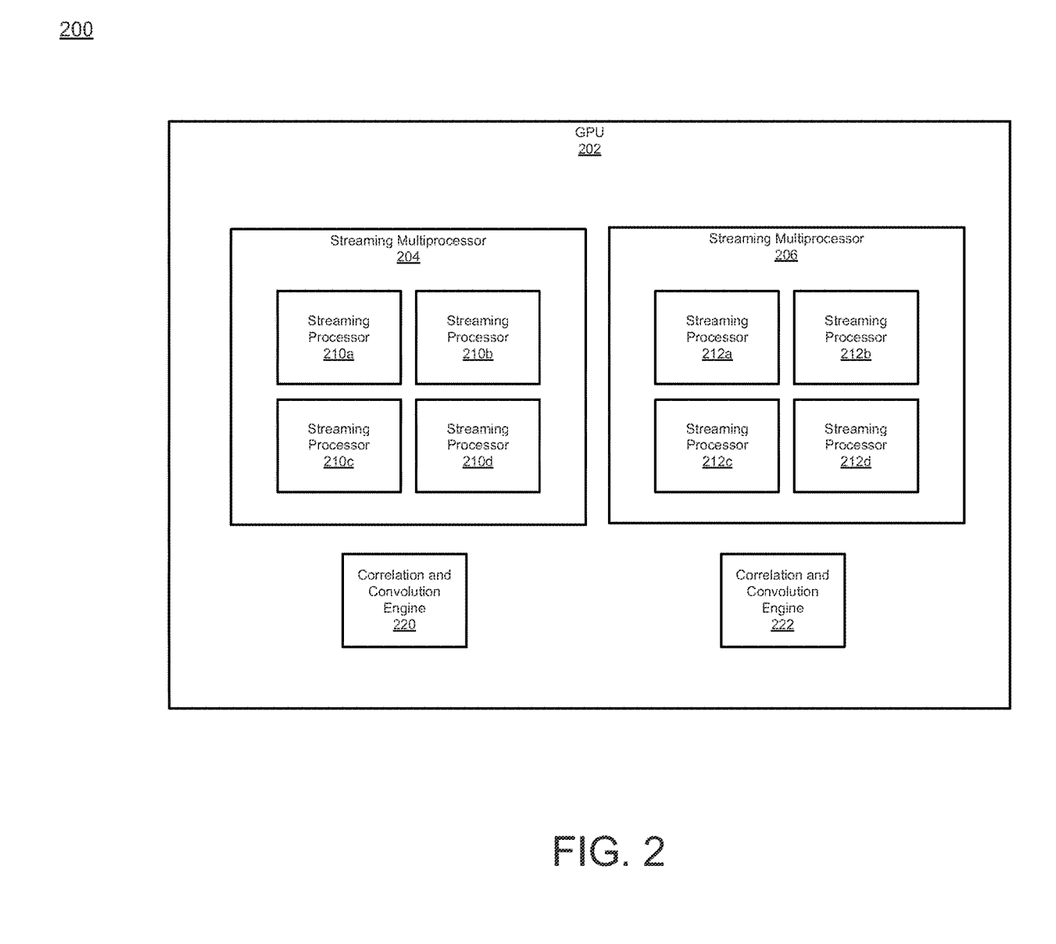
FIG. 2 shows a block diagram of exemplary components of a graphics processing unit (GPU) in accordance with one embodiment of the present invention.

FIG. 2 shows a block diagram of exemplary components of a graphics processing unit (GPU) in accordance with one embodiment of the present invention. FIG. 2 depicts an exemplary GPU and exemplary execution units of the GPU and exemplary acceleration engines. GPU 202 includes streaming multiprocessors 204-206 and correlation and convolution engines 220-222. It is noted that a GPU in accordance with embodiments of the present invention may have any number of streaming multiprocessors and engines and it not limited to two streaming multiprocessors and two correlation and convolution engines.

Streaming multiprocessor 204 includes streaming processors 210a-d. Streaming multiprocessor 206 includes streaming processor 212a-d. In one embodiment, streaming processor 210a-d and 212a-d are executions unit operable to execution functions and computations for graphics processing or general computing tasks (e.g., part of a general-purpose computing on graphics processing units (GPGPU) program).

Correlation and convolution engines 220-222 are operable to perform correlation and convolution computations for streaming multiprocessors 204-206. In one embodiment, correlation and convolution engines 220-222 correspond to streaming multiprocessors 204-206, respectively. In another embodiment, correlation and convolution engines 220-222 may be operable to be used by either of streaming multiprocessors 204-206. For example, correlation and convolution engines 220-222 may be used on an on-demand basis based on workload of the streaming multiprocessors 204-206 comprising correlation computations or convolution computations.

Streaming multiprocessors 204-206 may be flexibly programmable with multiple programming languages (e.g., using a general-purpose computing on graphics processing units (GPGPU) programming framework). In one embodiment, streaming processors 210a-d and 212a-d are programmable processing elements operable to perform graphics processing and/or perform general computing tasks (e.g., of a general-purpose computing on graphics processing units (GPGPU) application).

In one embodiment, each of the programmable processing elements (e.g., streaming multiprocessors 204-206) is operable to precompute a portion of at least one of a correlation computation and a convolution computation. In another embodiment, each of the programmable processing elements is operable to postcompute a portion of at least one of a correlation computation and a convolution computation.

In one embodiment, GPU 202 comprises a plurality of engines (e.g., correlation and convolution engines 220-222) each coupled to a respective programmable processing element of the plurality of programmable processing elements (e.g., streaming multiprocessors 204-206). Each engine may be operable to perform at least one of a correlation computation and a convolution computation. In one exemplary embodiment, each engine of the plurality of engines comprises a plurality of execution units and a configuration module operable to configure the plurality of execution units to perform at least one of the correlation computation and the convolution computation. Each of the execution units of the engine may be operable to perform one of a plurality of functions. The execution unit may be configured by the configuration module to perform one of a plurality of functions. A request to perform a correlation or convolution computation may be sent to the engine based an application programming interface (API) (e.g., running on a streaming multiprocessor 204).

Figure 3:
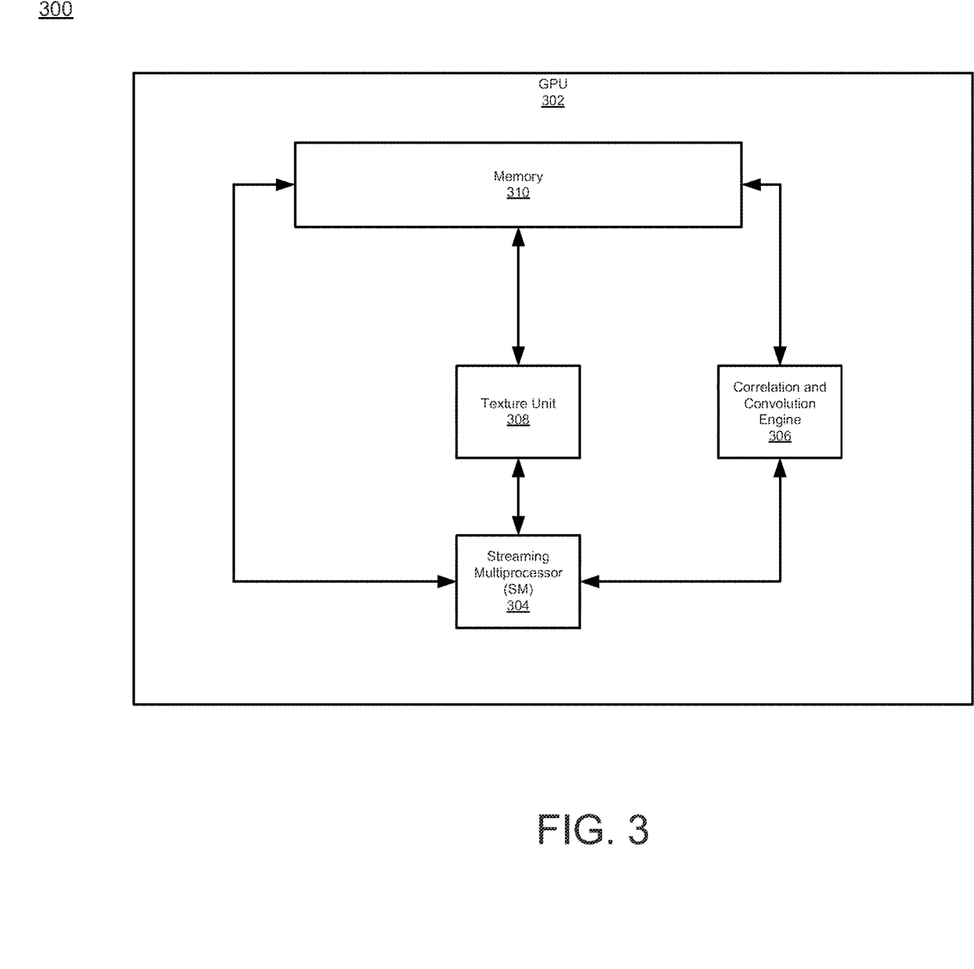
FIG. 3 shows an exemplary data flow diagram in accordance with one embodiment of the present invention.

FIG. 3 shows an exemplary data flow diagram in accordance with one embodiment of the present invention. FIG. 3 depicts exemplary communication and dataflow of an exemplary GPU comprising a streaming multiprocessor (SM) and a correlation and convolution engine. GPU 302 includes streaming multiprocessor (SM) 304, correlation and convolution engine 306, texture unit 308, and memory 310. It is appreciated that the components in GPU 302 are exemplary and GPU 302 may include additional or fewer components.

SM 304 is coupled to and operable to communicate with the correlation and convolution engine 306, texture unit 308, and memory 306. SM 304 may communicate with the correlation and convolution engine 306, texture unit 308, and memory 306 to perform various graphics processing and general computing tasks. SM 304 may offload correlation and convolution computations or work to the correlation and convolution engine 306. Correlation and convolution engine 306 is operable to accelerate correlation computations and convolution computations. In one embodiment, correlation and convolution engine 306 is operable to perform correlation computations and convolution computations in less time and/or using less power than SM 304.

Correlation and convolution engine 306 may be optionally coupled to memory 310. In one embodiment, correlation and convolution engine 306 receives requests, e.g., comprising a workload, and accesses data to perform the requests via SM 304. In another embodiment, correlation and convolution engine 306 receives requests from SM 304 and accesses memory 310 in performing the requests from SM 304.

In one embodiment, streaming multiprocessors (SMs) are flexibly programmable with multiple programming languages (e.g., using a General-purpose computing on graphics processing units (GPGPU) programming framework). SMs comprise various special engines which perform advanced mathematical or computational tasks beyond typical arithmetic and logical operations. In one embodiment, SM comprise special function units (SFUs) which compute transcendental mathematical functions. Texture engine 308 is operable to efficiently read 1, 2, or 3D (three-dimensional) image data and perform linear interpolation and format conversion.

Embodiments of the present invention are described herein with exemplary function types for illustrative purposes and should not be construed to limit embodiments of the present invention to the specific functions described herein. Different source and return data types, different dimensionality, and different mathematical formulas used in image and signal processing are considered within the scope and spirit of the invention.

Correlation and convolution engine 306 may be exposed to a programmer using a GPGPU framework (e.g., CUDA framework) as a function (e.g., or as an API). For example, a exemplary correlation function prototype:

float Match2D(unsigned char*tile1, int pitch1, unsigned char*tile2, int pitch2, int width, int height, int method);

The Match2D function takes pointers to two tiles (e.g., which can be located in various GPU memory locations including shared memory, constant memory, and global memory, etc.). Monochrome 8-bit unsigned char data is used but it is noted that other images types, including multiple channel image types may be used. Textures may be used for one or both of the tiles used in making a call to the Match2D function. The pitch parameter may specify the number of bytes between image rows in each tile while the width and height parameters specify the tile size. The method parameter may indicate the type of computation to perform (e.g., SAD, SSD, NCC, etc.). Embodiments of the present invention are operable to support functions that compute 1D or 3D matches or correlation as well.

An exemplary convolution function prototype may be:

unsigned char Convolve2D(unsigned char*tile1, int pitch1, unsigned char*tile2, int pitch2, int width, int height);

The parameters of Convolve2D may be substantially similar to the parameters of Match2D. The return type may be equivalent to the source type. Embodiments of the present invention support a wide variety of input types and return types for each of the supported functions. Embodiments of the present are operable to support functions that compute 1D or 3D convolution as well.

Embodiments of the present invention allow specific computations to be performed in a flexible manner under the control of a programmer. Large numbers of correlations, convolutions, or similarity metrics may be performed in parallel using the conventions of a GPGPU programming framework (e.g., CUDA programming framework). Individual threads may examine processed images and determine which regions of the image to compare with which templates or regions of other images.

Figure 4:
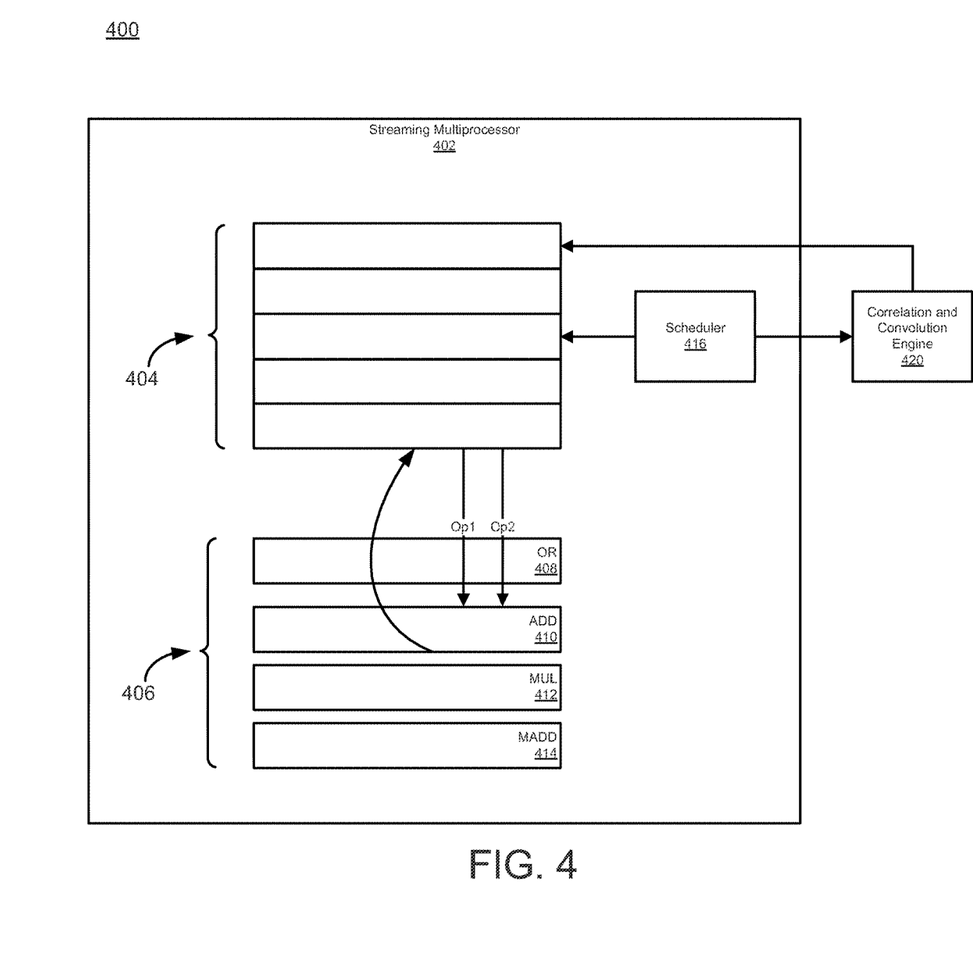
FIG. 4 shows a block diagram of exemplary components of an streaming multiprocessor (SM) and a scheduler in accordance with one embodiment of the present invention.

FIG. 4 shows a block diagram of exemplary components of a streaming multiprocessor (SM) and a scheduler in accordance with one embodiment of the present invention. FIG. 4 depicts exemplary operations performed by a streaming multiprocessor and correlation and convolution engine. Streaming multiprocessor 402 includes registers 404, computation units 406, and scheduler 416. In one embodiment, computation units 406 includes OR unit 408 operable to perform or logic operations, ADD unit 408 operable to perform addition operations, MUL unit 410 operable to perform multiplication operations, and MADD 412 operable to perform multiply-add operations.

Scheduler 416 is operable to select instructions (e.g., the next instruction) for execution by SM 402 or correlation and convolution engine 420. For example, SM 402 may receive an instruction to execute, access 32 elements from registers 404, execute the instruction based on the 32 elements and then output one or more results to registers 404. For example, Op1 and Op2 may be operands that are accessed from registers 404 and sent to ADD unit 410. ADD unit 410 adds Op1 and Op2 and sends the result to registers 404. In one embodiment, computation units 406 are configured in a pipeline such that operations are executed in parallel. It is appreciated that computation units 406 are exemplary and that SM 402 may include much more complex computation units.

Scheduler 416 is further operable to select instructions for execution by correlation and convolution engine 420. In response receiving an instruction from scheduler 416, correlation and convolution engine 420 is operable to access registers 404 for performing correlation and convolution based on the received instruction(s).

Figure 5:
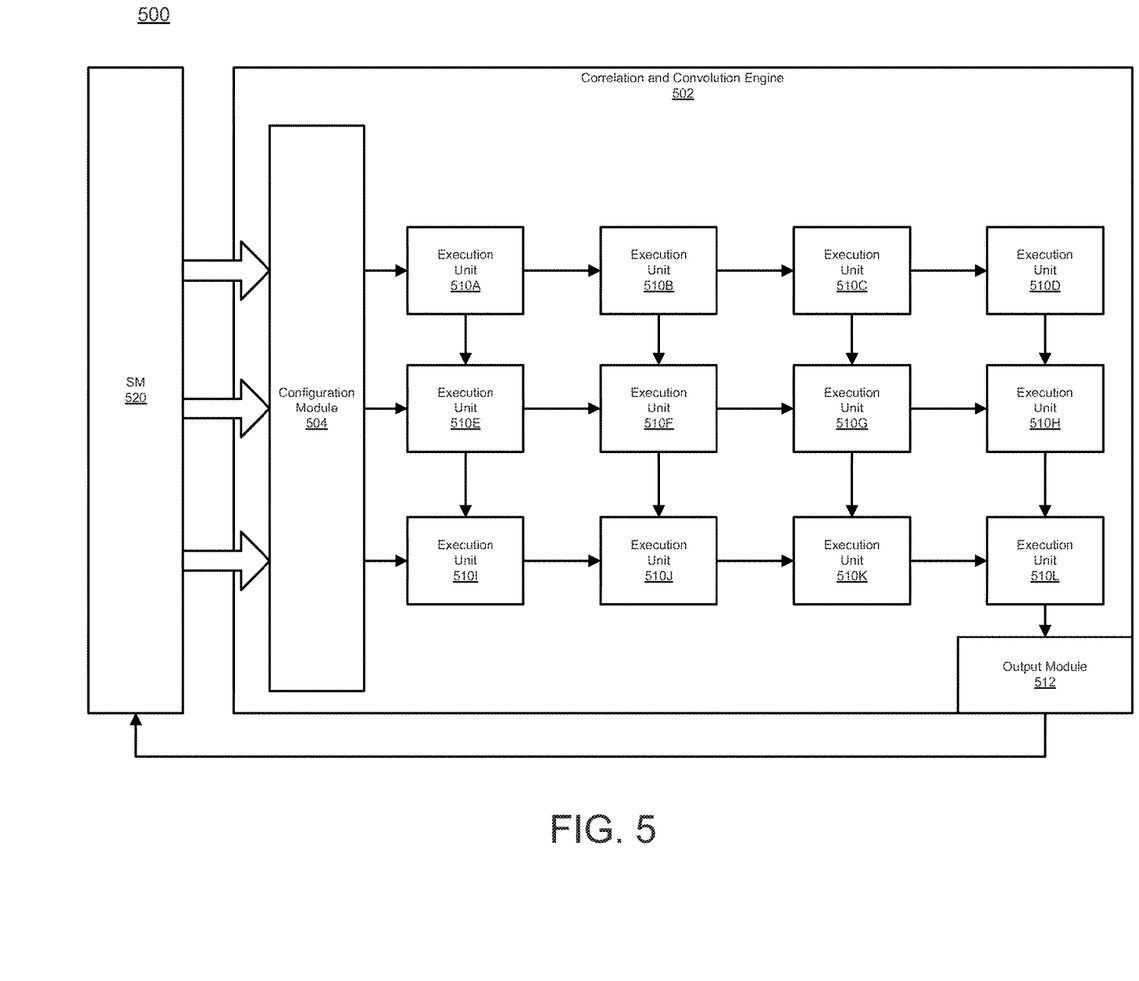
FIG. 5 shows a block diagram of exemplary components of a correlation and convolution engine in accordance with one embodiment of the present invention.

FIG. 5 shows a block diagram of exemplary components of a correlation and convolution engine in accordance with one embodiment of the present invention. FIG. 5 depicts components of a correlation and convolution engine include exemplary configuration module and execution units. Correlation and convolution engine 502 includes configuration module 504, execution units 510A-L, and output module 512. Correlation and convolution engine 502 is operable to perform correlation and convolution computations (e.g., accelerate correlation and convolution computations) for streaming multiprocessor (SM) 520. It is noted the number of execution units is exemplary and embodiments of the present invention are not limited to the number of execution units in FIG. 5.

Configuration module 504 is configured to determine the data flow of data between execution units 510A-L such that correlation or convolution may be performed on incoming data. Configuration module 504 may be operable to select between hard coded (e.g., fixed) or soft coded (e.g., flexible) configurations. For example, for a correlation, a plurality of execution units 510A-L may be configured to perform a minus operation on each element and the accumulation on the result of each minus operation. Each of executions units 510A-L may have a register for storing output. Results may then be sent to output module 512 which is operable to output the results to SM 520.

In one embodiment, execution units 510A-L are not as sophisticated as general purpose arithmetic logic units and may comprise the circuit elements necessary to perform the mathematical formulas described herein. In one exemplary embodiment, execution units 510A-L are fixed hardware that in combination can perform correlation and convolution computations. In one exemplary embodiment, execution units 510A-L may be operable to perform a set of fixed functions (e.g., add, subtract, multiple, divide, etc.). Execution units 510A-L in combination may then be configured by configuration module 504 to perform correlation or convolution. In another embodiment, configuration module 504 is operable to load data (e.g., into registers of correlation and convolution engine 502) received from SM 520 such that when the data is operated on by execution units 510A-L the execution units 510A-L perform correlation or convolution.

In one embodiment, correlation and convolution engine 502 is designed based on the maximum tile size which is supported and thus how many pixel computation units are provided. For example to support a 15×15 pixel kernel, 225 execution units are provided (e.g., which could also perform a 255 wide one dimensional computation). For larger kernel sizes, the correlation and convolution engine 502 may perform the computation in multiple iterative steps by maintaining the accumulated result at each step. It is noted that this may increase computation time.

GPUs using GPGPU frameworks (e.g., CUDA framework) are particularly well suited to operate efficiently even when some computations may introduce significant latency. SM 520 may quickly switch to processing different threads while waiting for a particular threads computation to be performed by correlation and convolution engine 502. Accordingly, some threads may efficiently utilize the remaining computational resources in the SM while other threads may wait for a result from correlation and convolution engine 502.

The computation of normalized cross correlation (NCC) may be challenging because normalized cross correlation requires the average value of the template and the region of the image to be correlated to be know. In one embodiment, instead of being designed to perform the average computation, correlation and convolution engine 502 is configured to precompute the template average, compute an integral image, and use the technique of summed area tables to determine the average of the image tile. It is noted that this technique is particularly efficient if many NCC computations are performed throughout an image. The average may be provided as a parameter to correlation and convolution engine 502. In one embodiment, an SM may compute the average value of the template (e.g., which may be efficient as the SM is walking through pixels). In another embodiment, correlation and convolution engine 502 may compute the average value of the template.

An exemplary convolution function prototype may be:
float Ncc2D(unsigned char*tile1, int pitch1, float average1, unsigned char*tile2, int pitch2, float average2, int width, int height);

The parameters of Ncc2D (2 dimensional normalized cross correlation) may be substantially similar to the parameters of Match2D. Embodiments of the present are operable to support functions that compute 1D or 3D convolution as well. It is noted that the function (and function prototypes) described herein may be APIs that allow a programmer to control which computations are performed by SM 520 and which are performed by the correlation and convolution engine 502.

Another common operation is to convolve the same tile in a source image with multiple filters of the same size but with different coefficients, which may be referred to as a filter bank. In one embodiment, correlation and convolution engine 502 is configured to efficiently implement a filter bank convolution by reading the source image pixels once.

An example filter bank function prototype is:
void ConvolveBank2D(unsigned char*src, int pitch, unsigned char*filter_bank, int width, int height, int num_filters, float*output_values);

The filters may be located in memory at the location defined by filter_bank and may be tightly packed. The returned values may be written to an array located as specified by output_values. Some of the parameters of ConvolveBank2D may be substantially similar to the parameters of Match2D. Embodiments of the present are operable to support filter bank functions that compute 1D or 3D convolution as well.

In one embodiment, correlation and convolution engine 502 is configured with more pixel computations or execution units at a lower precision for limited chip area or power budget situations. For example, 8 bit or even lower precision may be used or as high as 16 bit floating point computation unit may be used for a large number of applications. Correlation and convolution engine 502 may support source and destination of many data types and correlation and convolution engine 502 may be operable to support type conversion to the specific computation precision of correlation and convolution engine 502 (e.g., conversion to the precision of 16 bit floating point executions units).

Correlation and convolution unit 502 may thus receive a request (e.g., function call with parameters) from SM 520 and perform a plurality of computations to determine the result and send the result in response to the request (e.g., send the result to SM 520). A computation may sent to the engine based an application programming interface (API) call (e.g., from SM 520).

In one embodiment, streaming multiprocessor 520 may be part of a graphics pipeline operable to perform graphics processing. The graphics pipeline may further be operable to execute general computing tasks. In one embodiment, the graphics pipeline may be operable to pre-compute a portion of at least one of the correlation determination and the convolution determination. The graphics pipeline may further be operable to post-compute a portion of at least one of the correlation determination and the convolution determination.

In one embodiment, correlation and convolution engine 502 is an engine operable to perform at least one of a correlation determination and a convolution determination for the graphics pipeline. The engine is coupled to the graphics pipeline. The engine comprises a plurality of functional or execution units operable to be configured to perform at least one of the correlation determination and the convolution determination. In one embodiment, the engine is operable to perform at least one of the correlation determination and the convolution determination in less time and with less power than the graphics pipeline (e.g., SM 502).

The engine may include configuration module 504 which is operable to configure the engine to perform at least one of the correlation determination and the convolution determination. In one exemplary embodiment, each of the execution units of the engine is operable to perform one of a plurality of functions. The function to be performed may be configured or selected by the configuration module 504. Configuration module 504 may be operable to determine whether to configure the plurality of functional units for at least one of the correlation determination and the convolution determination based on an instruction received from the graphics pipeline.

Figure 6:
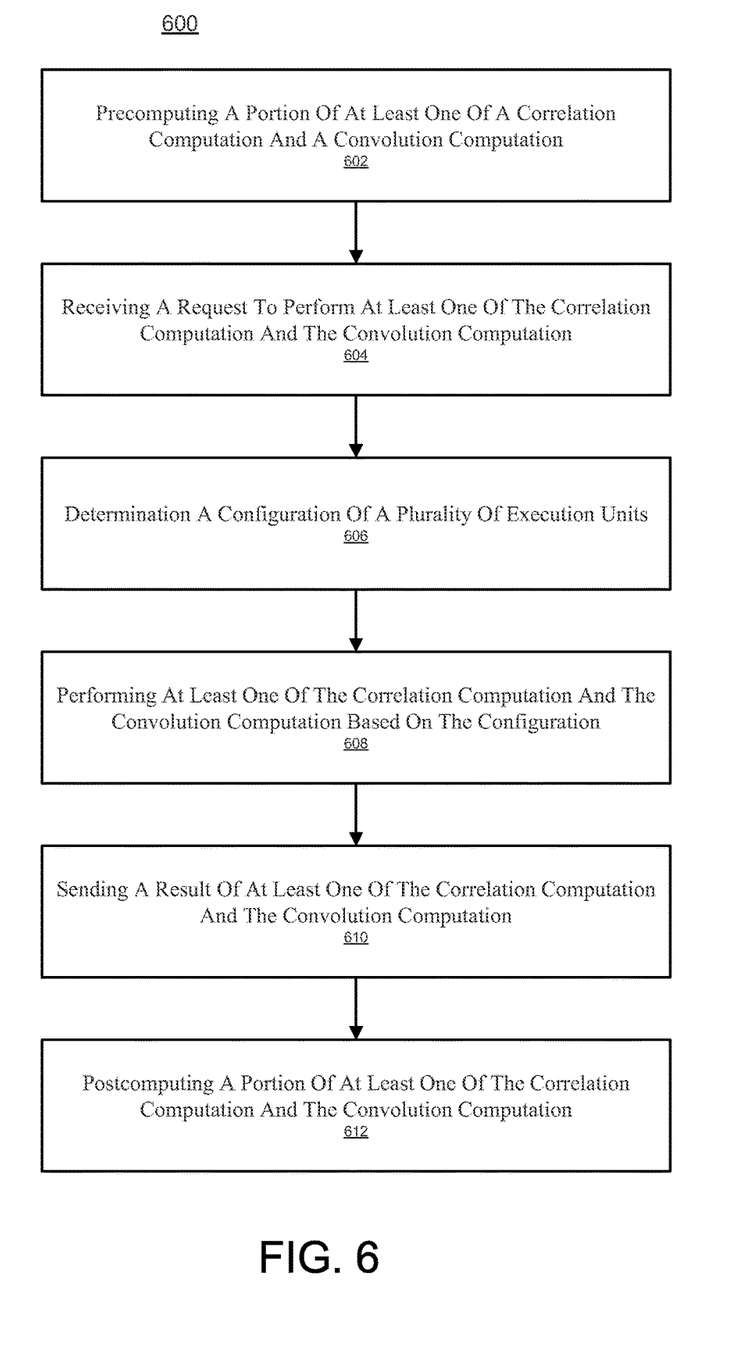
FIG. 6 shows a flowchart of an exemplary computer controlled process for performing exemplary computations using a correlation and convolution engine in accordance with one embodiment of the present invention.

With reference to FIG. 6, flowchart 600 illustrates example functions used by various embodiments of the present invention for correlation and convolution (e.g., computer vision algorithm acceleration). Although specific function blocks ("blocks") are disclosed in flowchart 600, such steps are examples. That is, embodiments are well suited to performing various other blocks or variations of the blocks recited in flowchart 600. It is appreciated that the blocks in flowchart 600 may be performed in an order different than presented, and that not all of the blocks in flowchart 600 may be performed.

FIG. 6 shows a flowchart of an exemplary computer controlled process for performing exemplary computations using a correlation and convolution engine in accordance with one embodiment of the present invention. FIG. 6 depicts a process for accelerating computer vision computations, in accordance with one embodiment of the present invention.

At block 602, a portion of at least one of the correlation computation and the convolution computation is precomputed. For example, where a computation involves an average, an SM (e.g., SM 520) may compute the average and provide the average to the correlation and computation engine.

At block 604, a request is received to perform at least one of a correlation computation and a convolution computation. In one embodiment, the request is received from a graphics pipeline of the GPU. The request may be received via an API, as described herein. The request may include any precomputed portions (e.g., from block 602).

At block 606, a configuration of a plurality of execution units is determined. In one embodiment, the configuration corresponds to at least one of a correlation computation and a convolution computation. In one embodiment, each of the execution units of the engine is operable to perform one of a plurality of functions, where the one of the plurality of functions is selected by a configuration module (e.g., configuration module 504).

At block 608, at least one of the correlation computation and the convolution computation is performed based on the configuration. In one embodiment, the performing of at least one of the correlation computation and the convolution computation is performed by an engine (e.g., correlation and convolution engine 502) coupled to the graphics pipeline (e.g., comprising SM 520).

At block 610, the result of at least one of the correlation computation and the convolution computation is sent to a processing unit of a graphics processing unit (GPU) (e.g., SM 520).

At block 612, a portion of at least one of the correlation computation and the convolution computation is postcomputed. For example, where a computation involves a square root of an average, the correlation and computation engine may compute the average and the SM performs a square root on the average. Embodiments of the present invention support partial acceleration of computations by correlation and convolution engine.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for performing computer processes, said system comprising:
   a streaming processor;
   a graphics pipeline associated with said streaming processor and operable to perform graphics processing, wherein said graphics pipeline is further operable to execute general computing tasks;
   an engine coupled to said streaming processor and comprising a plurality of functional units, wherein said plurality of functional units are configurable to perform at least one of a correlation determination and a convolution determination for said graphics pipeline, and wherein said engine is coupled to said graphics pipeline; and
   a configuration module disposed within said engine and operable to configure said engine to perform at least one of said correlation determination and said convolution determination, wherein a computation request is sent to said engine based an application programming interface (API) call,
   wherein said engine is coupled to another streaming processor, and wherein said engine is operable to perform said at least one of a correlation determination and a convolution determination for said streaming processor and said another streaming processor.

2. The system as described in claim 1 wherein each of said functional units is operable to perform one of a plurality of functions related to said at least one of said correlation determination and said convolution determination, wherein said one of said plurality of functions is selectable by said configuration module.

3. The system as described in claim 1 wherein said configuration module is operable to determine whether to configure said plurality of functional units to enable said engine to perform said at least one of said correlation determination and said convolution determination based on an instruction received from said graphics pipeline.

4. The system as described in claim 1 wherein said engine is operable to perform said at least one of said correlation determination and said convolution determination in at least one of less time and less energy than said graphics pipeline.

5. The system as described in claim 1 wherein said graphics pipeline is operable to pre-compute a portion of said at least one of said correlation determination and said convolution determination.

6. The system as described in claim 1 wherein said wherein said graphics pipeline is operable to post-compute a portion of said at least one of said correlation determination and said convolution determination.

7. The system of claim 1, wherein said streaming processor is configured to switch to processing a different thread when waiting for a thread computation being performed by said engine.

8. The system of claim 1, wherein said streaming processor is configured to operate using a general purpose graphics processing unit (GPGPU) programming framework.

9. A method of accelerating computer computations, said method comprising:
an engine receiving a request via an application programming interface (API) to perform at least one of a correlation computation and a convolution computation, wherein said engine is coupled to a streaming processor and another streaming processor of a graphics processing unit (GPU);
a configuration module determining a configuration of a plurality of execution units of said engine, wherein said configuration corresponds to said at least one of said correlation computation and said convolution computation, wherein said configuration module is disposed within said engine;
said engine performing said at least one of said correlation computation and said convolution computation based on said configuration to generate a result;
sending said result of said at least one of said correlation computation and said convolution computation from said engine to said streaming processor of said graphics processing unit (GPU);
said engine performing said at least one of said correlation computation and said convolution computation to generate another result; and
sending said another result from said engine to said another streaming processor of said graphics processing unit (GPU).

10. The method as described in claim 9 further comprising:
precomputing a portion of said at least one of said correlation computation and said convolution computation.

11. The method as described in claim 9 further comprising:
postcomputing a portion of said at least one of said correlation computation and said convolution computation.

12. The method as described in claim 9 wherein each of said execution units is operable to perform one of a plurality of functions, wherein said one of said plurality of functions is selectable by a configuration module.

13. The method as described in claim 9 wherein said request is received from a graphics pipeline of said GPU, and wherein said streaming processor is part of said graphics pipeline.

14. The method as described in claim 13 wherein said at least one of said correlation computation and said convolution computation comprises a computation of a sum of squared differences (SSD), a sum of absolute of differences (SAD), normalized cross correlation (NCC), convolution, formal correlation, or a combination thereof.

15. The method of claim 9, wherein said streaming processor is configured to switch to processing a different thread when waiting for a thread computation being performed by said engine.

16. A programmable processor comprising:
a graphics pipeline comprising a plurality of programmable processing elements operable to perform computations, wherein said plurality of programming processing elements comprise streaming processors; and
a plurality of engines each coupled to a respective programmable processing element of said plurality of programmable processing elements, wherein said engine is dedicated to perform at least one of a correlation computation and a convolution computation responsive to a request sent via an Application Programming Interface (API), and wherein each engine of said plurality of engines comprises a plurality of execution units and a configuration module operable to configure said plurality of execution units to enable said engine to perform said at least one of said correlation computation and said convolution computation for at least two streaming processors in said graphics pipeline.

17. The programmable processor as described in claim 16 wherein said plurality of programmable processing elements is operable to perform general computing tasks.

18. The programmable processor as described in claim 16 wherein each of said execution units of said engine is operable to perform one of a plurality of functions related to said at least one of said correlation computation and said convolution computation, wherein said one of said plurality of functions is operable to be configured by said configuration module.

19. The programmable processor as described in claim 16 wherein each of said programmable processing elements is operable to precompute a portion of said at least one of said correlation computation and said convolution computation.

20. The programmable processor as described in claim 16 wherein each of said programmable processing elements is operable to postcompute a portion of said at least one of said correlation computation and said convolution computation.

21. The programmable processor of claim 16, wherein said respective programmable processing element is configured to switch to processing a different thread when waiting for a thread computation being performed by said engine.

* * * * *